United States Patent [19]

Leo et al.

[11] 4,263,184

[45] Apr. 21, 1981

[54] HOMOGENEOUS PREDISPERSED FIBER COMPOSITIONS

[75] Inventors: Thomas J. Leo; Anders H. Johansson, both of Yardley, Pa.

[73] Assignee: Wyrough and Loser, Inc., Trenton, N.J.

[21] Appl. No.: 757,008

[22] Filed: Jan. 5, 1977

[51] Int. Cl.$^3$ .............................. C08K 7/02; C08K 7/04
[52] U.S. Cl. .................................. 260/17.4 CL; 260/3; 260/8; 260/29.6 R; 260/29.7 R; 260/40 R; 260/42.14; 260/42.15; 260/42.16; 260/42.17; 260/42.18; 260/42.22; 260/42.46; 260/42.47; 260/42.48; 260/42.49; 260/42.51; 260/42.52; 260/42.55; 260/52.56; 260/741; 525/935
[58] Field of Search .............. 260/17.4 CL, 42.55, 260/42.18, 42.17, 42.47, 3, 8, 741, 29.6 R, 29.7 R, 40 R, 42.14, 42.15, 42.16, 42.22, 42.43, 42.46, 42.48, 42.49, 42.51, 42.52, 42.56; 525/935

[56] References Cited

U.S. PATENT DOCUMENTS

| | | | |
|---|---|---|---|
| 2,534,814 | 12/1950 | D'Olier | 260/42.47 |
| 2,550,143 | 4/1951 | Eger | 260/42.47 |
| 2,715,066 | 8/1955 | Feigley | 260/42.47 |
| 2,769,713 | 11/1956 | Wilson | 260/42.47 |
| 3,117,944 | 1/1964 | Harrell | 260/42.55 |
| 3,654,219 | 4/1972 | Boyer | 260/42.18 |

OTHER PUBLICATIONS

Casey, James P., Pulp and Paper, vol. II, Interscience Pub. Inc., New York, 1960, pp. 602-623 & 971-981.

*Primary Examiner*—James H. Derrington
*Attorney, Agent, or Firm*—James R. Laramie

[57] ABSTRACT

A homogeneous predispersed fiber composition useful for dispersing a fibrous material in a rubber or plastic compound stock, said composition comprising a fibrous material and a rubber or plastic polymer binder, wherein said composition is prepared by mixing a latex of the rubber or plastic polymer with the fibrous material to form a wetted fiber mixture, mixing a coagulant with the wetted fiber mixture thereby forming the predispersed fiber composition, wherein the total amount of water present in the wetted fiber mixture prior to coagulation is substantially equal to that required to completely wet the fibrous material by either capillary action, surface adsorption or a combination thereof.

53 Claims, 1 Drawing Figure

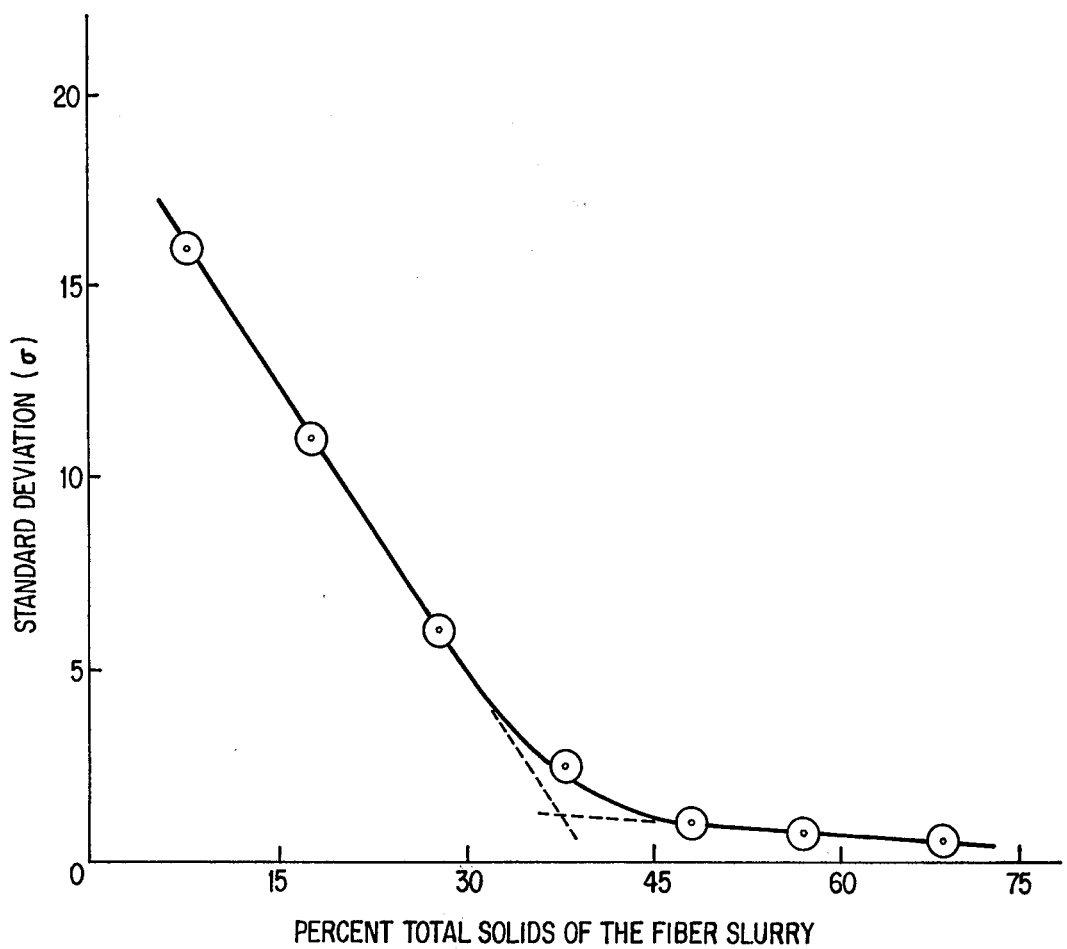

HOMOGENEOUS PREDISPERSED FIBER COMPOSITIONS

BACKGROUND OF THE INVENTION

1. Field of the Invention

The invention relates to predispersed fiber compositions and to the process for preparing such compositions. More particularly, the invention relates to such predispersed fiber compositions suitable for use in reinforcing rubber or plastic compounds. Such predispersed fibers disperse rapidly and uniformly into the rubber or plastic compound stock to which they are added.

2. Description of the Prior Art

Fibrous fillers are presently in use as reinforcing agents for plastic and rubber compounds. For example, asbestos, cellulose, glass, inorganic and synthetic fibers having various dimensions and pretreatments are currently employed to reinforce plastics. In the rubber industry, including elastomers generally, fibrous fillers such as cellulose, glass, inorganic and synthetic cord and fabric are commonly used to increase modulus and tensile strength in tires, belts and hose. Short fibers, such as chopped rayon, polyester and cotton are also frequently used to increase modulus in such items as V-belts.

Prior to the present invention, problems were encountered in obtaining uniform coverage and dispersion of the fibers throughout the rubber matrix during a reasonable and practical mixing cycle. The poor processibility of these fibers with rubber formulations has been a serious handicap to their acceptance as suitable reinforcing agents. Pretreated fibers are commercially available which have been coated with diisocyanates and resorcinol-formaldehyde-latex dips. Such pretreated fibers are expensive and unsatisfactory because the coating operation is performed on continuous filaments which are subsequently chopped, thus exposing untreated ends. Examples of such methods can be found in U.S. Pat. Nos. 3,639,311, 3,746,669, 3,793,130 and 3,940,357.

In U.S. Pat. No. 3,793,287, a process is disclosed for preparing paste extrudable powder mixtures of polytetrafluoroethylene and an inorganic filler. When fibers are employed as the filler, dilute aqueous dispersions of polytetrafluoroethylene are mixed with relatively minor amounts by weight of glass fibers and a specifically defined cationic substance which imparts hydrophobic properties to the filler. A mixture of polytetrafluoroethylene and filler was then precipitated from the dilute slurry by thorough stirring.

In the paper industry, natural and synthetic rubber latices have been added to slurries of fibers, such as cellulose, asbestos, cork, glass, regenerated leather and synthetic fibers, prior to sheet formation to produce products having certain desirable properties. This process is called wet-end addition. The wet-end addition process comprises preparing the pulp stock with fresh water and adjusting the pH of the stock to a minimum of 8.0 with soda ash or dilute sodium hydroxide. Various additives such as stabilizers or antioxidants may be included in the stock if desired. A latex, such as neoprene, is then thoroughly mixed into the stock and coagulated by the addition of a dilute coagulant, such as alum, reducing the pH to 4.5. Wet-end addition is usually performed at a total solids content of about 2-4 percent by weight. Widespread use of the wet-end addition process for incorporating additives and thermoplastic materials into paper has been discouraged by disadvantages such as fouling of equipment, wire and felt plugging and problems or retention causing economic losses and pollution.

SUMMARY OF THE INVENTION

The disadvantages and limitations of the prior art are alleviated by the present invention. In accordance with the present invention, fibrous filler material is coprecipitated with a latex of a rubber or plastic polymer to form a homogeneous predispersion of fibers and rubber or plastic. The serum produced upon coagulation of the mixture of fibers and latex is essentially free of suspended solids. It has been found that the greater the homogeneity of the fiber predispersion produced, the more rapid, uniform and thorough will be the dispersion of the fibrous material into the rubber or plastic compound stock to be reinforced. Predispersed fiber compositions prepared by mixing a latex of a rubber or plastic polymer with a fibrous material to form a wetted fiber mixture and then mixing the wetted fiber mixture with a coagulant can be used to rapidly, uniformly and thoroughly disperse the fibrous material into a rubber or plastic compound stock by mechanically mixing the predispersed fiber composition with the rubber or plastic compound stock.

In order to obtain predispersed fibers having the greatest degree of homogeneity possible, it has unexpectedly been found that the total amount of water present in the mixture of fibrous filler material and latex prior to coagulation should be substantially equal to that required to completely wet the fibrous material through capillary action, surface adsorption or both. Any decrease in the amount of water present in the wetted fiber mixture will increase the heterogeneity of the fiber dispersion produced upon coagulation of the mixture. However, it has been found most unexpectedly that a significant increase in the amount of water present in the wetted fiber mixture will not substantially increase the heterogeneity of the coagulated fiber predispersion until the amount of water present is such that polymer is coagulated independently of the fibers.

The mixture of fibrous material and polymer latex may additionally contain rubber process or extender oils or chemical plasticizers, antidegradants, as well as chemicals which promote adhesion between the fibrous material and the rubber or plastic compound which the fibrous material is ultimately intended to reinforce.

Predispersed fiber compositions made in accordance with the present invention are substantially completely homogeneous, can be accurately weighed, and due to their greater homogeneity, can be more rapidly, uniformly and thoroughly dispersed into the rubber or plastic compound stock to be reinforced.

BRIEF DESCRIPTION OF THE DRAWING

The FIGURE is a plot of the standard deviation ($\sigma$) in the percent by weight of fibers present in predispersed fiber compositions produced in accordance with the present invention versus the precent of total solids of the fiber slurry.

DESCRIPTION OF THE PREFERRED EMBODIMENTS

In accordance with the present invention, a mixture of a fibrous filler, a latex of a rubber or plastic polymer, and, optionally, such ingredients as plasticizers, antidegradants and adhesion promoters, is coprecipitated to form a fiber predispersion of substantially optimum homogeneity.

A wide range of fibrous filler materials are suitable for use in the present invention. Suitable fibers are not restricted to particular compositions or dimensions although they are generally characterized by relatively high tenacity and a high aspect ratio. Exemplary suitable fibers include, but are not limited to, natural fibers, such as wool and silk, cellulose fibers, such as alpha cellulose, cotton, jute, pulp preforms and sisal, mineral fibers, such as asbestos, semisynthetic fibers, such as rayon and inorganic substances extruded in fibrous form, e.g. boron, boron carbide, boron nitride, carbon, aluminum silicate and fused silica, glass fibers, such as chopped strand, filaments, glass ribbon, glass yarn and reinforcing mat, metallic fibers, such as those composed of metal, plastic-coated metal, metal-coated plastic or a core completely covered by metal, synthetic fibers, such as polyamides, polyesters, acrylics, polyolefins, polyacrylonitrile, polyvinyl alcohol and the like, and whiskers.

The composition of the polymer latex which is mixed with the fibrous filler material is not limited by the process of the present invention, and is only limited by the desired end use of the product. The polymer can be any of the elastomers and plastics commonly prepared by the emulsion polymerization process including, for example, natural rubber, polybutadiene, copolymers of butadiene and one or more comonomers, such as styrene, acrylonitrile, methylmethacrylate, vinylpyridine, or a derivative of it and a carboxylic acid, polymers of substituted butadiene, e.g. polyisoprene and polychloroprenes, copolymers of vinyl acetate and ethylene, butyl rubbers, i.e., copolymers of an iso-alkene with a dialkene; polyisobutylene, poly(vinyl chloride), poly(vinyl chloride-vinylidene chloride), poly(vinylidene chloride), acrylonitrile-butadiene-styrene copolymer (ABS), and styrene-acrylonitrile copolymer (SAN). Also suitable for use in this process are any polymers produced by a solution polymerization process that can be converted to emulsion form, usually by emulsifying an organic solution of the polymer with an aqueous soap solution and then driving off the organic solvent. Examples of such polymers include EPDM, EPR, oxidized polyethylene, polyisobutylene, butyl rubber, polyisoprene, and the solution prepared block copolymers of styrene and butadiene sold under the trade names of Kraton and Solprene Plastomers and materials identified as TPR Thermoplastic Rubbers.

The mixture of fibrous material and polymer latex may additionally contain antidegradants or stabilizers to extend the shelf life of the fiber dispersion produced, plasticizers, and adhesion promoters. Suitable plasticizers include any material employed for that purpose by the rubber or plastics industries. Examples of suitable plasticizers include aromatic, naphthenic and paraffinic oils, paraffins, waxes, phthalate esters, esters of adipic, azelaic and sebacic acids, di-2-ethylhexylphthalate, dioctyl phthalate (DOP), tricresyl phosphate (TCP), and other organic phosphates, and glycol-dicarboxylic acid polyesters. These plasticizers are preferably emulsified before blending with the latex, although with suitable equipment, they can be emulsified directly into the latex. Any of the well-known adhesion promoters can be added to the mixture to enhance adhesion between the fibrous material and the rubber or plastic compound stock to which the fiber dispersion ultimately is to be added. Suitable adhesion promoters include water stable block diisocyanates, water stable silanes or silicones, and resorcinol-formaldehyde-latex systems.

The concentrations of fibrous filler material and the binder comprising the polymer latex and any of the other ingredients optionally included are not critical. Each of the concentrations will depend on the type of fibrous filler material and its dimensions and physical properties, the composition of the binder, and the composition of the rubber or plastic compound which is intended to be reinforced with the fibrous material. Since the purpose of preparing a fiber predispersion is to provide a means for rapidly, uniformly and thoroughly incorporating a fibrous material into a rubber or plastic compound in order to reinforce the compound, it is desirable to increase the concentration of the fibrous material as high as possible while maintaining processibility for two reasons. First, since the composition of the polymer latex used in preparing the fiber predispersion may not be the same as the composition of the rubber or plastic compound to be reinforced, it is desirable to maintain the concentration of the polymer as low as possible so that the amount of "impurity" which may be introduced into the rubber or plastic stock is kept to a minimum. And second, it is more economical to maintain the concentration of polymer as low as possible in order to lower the cost of the predispersed fibers for a given amount of fibers to be introduced into the rubber or plastic stock. It is desirable, therefore, for the fiber dispersion to comprise greater than about 50 percent by weight of fibrous material. Preferably, the fibrous material comprises from about 75 to about 95 percent by weight of the fiber predispersion. Thus, it is evident that many variations of fiber predispersions can be prepared depending on the choice of fiber composition, fiber dimensions, binder compositions, and concentration of the various ingredients. It has been found, however, that regardless of the composition of the particular fiber predispersion produced, the most homogeneous fiber predispersion which can be made from any given set of ingredients will be made in accordance with the process set forth herein.

Predispersed fiber compositions are prepared in accordance with the following procedure. Initially, the polymer latex is combined with any ingredients optionally included, such as an adhesion promoter or an emulsion of a plasticizer, and any water of dilution that may be required. This mixture is then blended with the fibrous filler material, either by adding the mixture to the fibrous material or by adding the fibrous material to the mixture. Then the resulting wetted fiber mixture is coprecipitated by mixing it with a solution of a coagulant. The serum is then decanted off. Wash water is added and then also decanted off. Finally, the predispersed fiber composition is dried by suitable means, such as a forced air oven, partial vacuum evaporation, and the like.

A more complete appreciation of the invention will be realized by reference to the following specific examples and to the FIGURE which relate to specific fibrous materials, binder compositions and methods of preparing predispersed fiber compositions. The following examples are not intended to limit the invention disclosed herein except to the extent that limitations are specifically stated or to the extent to which limitations appear in the appended claims.

EXAMPLE I

In an effort to prepare a fiber predispersion comprising 80 percent by weight fibers and 20 percent by weight polymer binder, 34.4 grams of a polychloroprene latex having a high concentration of suspended solids (Neoprene 635 from E. I. duPont deNemours & Co., Inc., 58% TS) were added directly to 80.0 grams of ¼-inch chopped rayon fiber (8C5525 from Mini-Fibers, Inc.). The aqueous phase of the latex wetted only a small portion of the total fibers by capillary action and surface adsorption. Some of the fibers were wetted by all of the latex while the remainder were dry and unwetted by the latex. Consequently, a homogeneous fiber predispersion was not produced upon coagulation. In order to obtain a homogeneous fiber predispersion using this polymer latex having a high percentage of suspended solids, some water of dilution would have to be added to the binder emulsion. For other polymer latices that can be obtained commercially with low percentages of suspended solids, such as SBR or nitrile latices (approximately 20% TS), it has been found that there is sufficient aqueous phase so that no water of dilution need be added if adequate mechanical agitation is provided. Even with latices having low solids content, it may be easier, from a processing standpoint, to add a little water of dilution.

EXAMPLE II

A fiber predispersion was prepared by mixing 34.4 grams of a polychloroprene latex (Neoprene 635, 58% TS) with 60 ml. of a 1% magnesium lignosulfonate solution and then adding 80.0 grams of ¼-inch chopped rayon fibers (8C5525 from Mini-Fibers, Inc.). The fibers were mixed in the diluted latex for a few minutes until all of the fibers were saturated. This wetted fiber slurry was then poured into two liters of a solution containing 40 grams of Epsom salts. The coagulation was uniform and complete. Since the serum was a little hazy, it was thought that there might have been insufficient magnesium sulfate. The coprecipitated fiber predispersion was rinsed once with water and allowed to dry overnight.

EXAMPLE III

A fiber predispersion was prepared by a method similar to that used in Example II with an effort to eliminate the hazy serum. 34.4 grams of polychloroprene latex (Neoprene 635, 58% TS) was mixed with 40 ml. of a 1% magnesium lignosulfonate solution. This mixture was then quantitatively transferred to 80.0 grams of ¼-inch chopped polyester fibers (6E6025 from Mini-Fibers, Inc.) using 75 ml. of water. This wetted fiber slurry after being thoroughly mixed was poured into two liters of a solution containing 60 grams of magnesium sulfate. The resulting coprecipitate appeared to be homogeneous but the serum was very cloudy. A little sulfuric acid was added with no effect. A cationic polyamine-type coagulation aid (Nalco 107 from Nalco Chemical Corporation) was also added and the serum cleared somewhat, although not completely. Finally, another 20 grams of Epsom salts were added. None of these additives produced an absolutely clear serum. The fiber predispersion was then decanted and washed several times to remove any possible contaminants.

EXAMPLE IV

A fiber predispersion was then prepared without the lignosulfonate used in Examples II and III to insure complete coagulation. 34.4 grams of a polychloroprene latex (Neoprene 635, 58% TS) was added to 80 grams of wet ¼-inch chopped polyester fibers (6E6025 from Mini-Fibers, Inc.). This fiber slurry was then added to two liters of a solution containing 60 grams of Epsom salts. The resulting coprecipitate appeared to be homogeneous but the serum was quite cloudy. Sulfuric acid and a coagulation aid (Nalco 107) were added. Although these additives made an appreciable improvement, they did not completely clear up the serum. The predispersed fibers were washed several times and placed in an oven to dry.

In view of the unsuccessful attempts to obtain clear serum in Examples II–IV, it is believed that the dilution of the wetted fiber mixture by the large volume of coagulation solution produced a colloidal suspension of Neoprene rubber by permitting particles of Neoprene to coagulate independently of one another and of the fibers. Because free rubber could coagulate independent of the fibers, substantially homogeneous fiber predispersions had not been produced.

EXAMPLE V

A substantially homogeneous fiber predispersion was prepared by first weighing 80 grams of ¼-inch chopped polyester (6E6025 from Mini-Fibers, Inc.) into a two liter beaker. Then 34.4 grams of polychloroprene latex (Neoprene 635, 58% TS) was weighed in directly on top of the fiber. This mixture was mixed as well as possible but was not homogeneous due to the water absorbing nature of the fibers. In order to obtain a homogeneous mixture, water was gradually added until the fiber-latex slurry was uniform. This was found to be 30 ml. of added water. There was no free liquid in the bottom of the beaker. A solution of 60 grams of Epsom salts in 225 ml. of water was prepared and poured slowly into the wetted fiber mixture with stirring until no uncoagulated latex was seen. It was found that only 125 ml. of the magnesium sulfate solution was used. The mixture coagulated evenly, completely, and with no suspended solids in the serum. The coprecipitate did not mat up appreciably and formed a very homogeneous product. Then 200 ml. of water was added and the whole mixture was stirred to wash out any soluble magnesium ions present. The coprecipitate was then pressed free of the bulk of the liquid and allowed to dry. Significantly, the wash water was also perfectly clear indicating that no loose rubber was knocked free of the fiber and that there was no uncoagulated latex present. The dried fiber predispersion was passed through a mill and found to be quite processible.

It has subsequently been found that homogeneity is further improved and mixing time reduced if any required water of dilution is first added to the latex prior to the addition of the dilute latex to the fiber.

EXAMPLES VI–XIII

Thus, it was determined that in order to obtain a fiber predispersion having the greatest degree of homogeneity possible from any given mixture of fibrous material and polymer latex, the total amount of water present in the mixture of fibrous material and latex prior to coagulation should be substantially equal to that required to completely wet the fibrous material through capillary action and surface adsorption. The following simple procedure may be followed to determine the necessary amount of water. First, weigh 10.0 grams of the desired fibrous material into a 250 ml. beaker containing a blade spatula. Then add water dropwise to the fibers with stirring until fibers are all wetted and no free water is noticeable. Free water is observed by tilting the beaker to one side, placing the blade of the spatula between the fibers and the wall of the beaker on the low side, pushing the fiber upward with the spatula away from the low point of the beaker and waiting a minute to see if any free water accumulates in the bottom of the beaker. Finally, the beaker, fiber, water and spatula are weighed to determine the amount of water added to the fibers. The optimum water concentration is that amount which totally wets the fibers through capillary action and surface adsorption and does not drain from the fibers upon standing. Since the above procedure provides the total amount of aqueous phase held by the fibers, when calculating the necessary amount of water of dilution to be added to the latex when preparing a fiber predispersion, the aqueous phase of the latex must be included as part of the total water.

To demonstrate the applicability of this process to various fiber compositions, fiber predispersions were prepared with chopped rayon, chopped polyester, white cotton flock, asbestos, and chopped fiberglass strands. Using the above procedure, optimum water concentrations were determined as follows: 33.0 grams of water per 10.0 grams of #902 white cotton flock, 10.6 grams of water per 10.0 grams of 5R-1 asbestos, 17.3 grams of water per 10.0 grams of 7TS-1 asbestos, and 6.0 grams of water per 10.0 grams of 419BB ¼-inch chopped fiberglass strands. Predispersions of these four fibers were prepared by adding the required amount of dilution water to the polymer latex and then adding the diluted latex to the fibrous material. The wetted fiber mixtures obtained were then coagulated with an excess of Epsom salts solution, washed and dried. These various fiber predispersions prepared by this technique are set forth in Table I below.

Homogeneous predispersions of ¼-inch and ½-inch chopped rayon fibers and ⅛-inch and ¼-inch chopped polyester fibers were also prepared by regulating the amount of dilution water so that no free rubber particles coagulated independently of one another and of the fibers. These fiber dispersions are also set forth in Table I below:

TABLE I predisperions of Various Fiber Compositions

| Example Number | Fiber Composition | Wt. % Fiber | Wt. % Neoprene 635 | Wt. % SBR | Wt. Fiber, grams | Wt. Neoprene 635 Latex, grams | Wt. SBR Latex, grams | Wt. Dilution Water, grams |
|---|---|---|---|---|---|---|---|---|
| 6 | ¼" chopped rayon[1] | 80 | 20 | — | 80.0 | 34.4 | — | 60 |
| 7 | ½" chopped rayon[2] | 85 | — | 15 | 16.0 | — | 21.7 | —[9] |
| 8 | ⅛" chopped polyester[3] | 85 | 15 | — | 126.2 | 38.4 | — | 300 |
| 9 | ¼" chopped polyester[4] | 85 | 15 | — | 225.0 | 77.6 | — | 470 |
| 10 | White cotton flock[5] | 85 | 15 | — | 10.0 | 3.05 | — | 31.7 |
| 11 | Asbestos[6] | 85 | 15 | — | 10.0 | 3.05 | — | 4.3 |
| 12 | Asbestos[7] | 85 | 15 | — | 10.0 | 3.05 | — | 16.0 |
| 13 | ¼" chopped fiberglas strands[8] | 85 | 15 | — | 10.0 | 3.05 | — | 4.7 |

[1] 8C5525 from Mini-Fibers, Inc.
[2] 8E5550 from Mini-Fibers, Inc.
[3] 6F60135 from Mini-Fibers, Inc.
[4] 6E66025 from Mini-Fibers, Inc.
[5] #902 from Claremont Flock Corp.
[6] 5R-1 from Peltz-Rowley
[7] 7TS-1 from Peltz-Rowley
[8] 419BB from Owens-Corning Fiberglas Corp.
[9] Very long mixing time required. Could have used a little water for a better mix.

EXAMPLES XIV–XXXI

The following examples illustrate the applicability of the present process to the preparation of fiber predispersions having various concentrations of fibrous material, latex and other additives such as plasticizers and adhesion promoters. In Examples XIV–XIX set forth in Table II below, various percentages of polychloroprene latex (Neoprene 635, 58% TS), a 50% emulsion of a bis phenyl adduct of methylene bis (4-phenyl isocyanate) (Hylene MP from E. I. duPont deNemours & Co.), a 25% emulsion of dioctyl phthalate (DOP), and water of dilution were mixed. This mixture was then blended with various percentages of ⅛-inch chopped polyester fiber (6F60135 from Mini-Fibers, Inc.). The Epsom salts coagulation solution was then added, the serum decanted, and the coprecipitate washed with water and dried overnight in a forced air oven at 120° F. The same procedure was followed in Examples 20–31 set forth in Table III below with the exception that a 56% emulsion of Hylene MP and ¼-inch chopped polyester fibers (6E6025 from Mini-Fibers, Inc.) were used.

TABLE II

| Example Number | Wt. % Fiber | Wt. % Rubber | Wt. % Oil | Wt. % Hylene MP | Weight ⅛" chopped Polyester Fiber, grams | Weight Neoprene 635 Latex (58% TS), grams | Weight DOP emul. 25% DOP, grams | Weight Hylene MP 50% Emul. grams | Water of Dilution, ml. | Epsom salts, grams/water, ml. |
|---|---|---|---|---|---|---|---|---|---|---|
| 14 | 79.21 | 19.80 | 0.00 | 0.99 | 362.9 | 156.4 | 0.0 | 9.08 | 800 | 150/1000 |
| 15 | 79.21 | 14.85 | 4.95 | 0.99 | 118.8 | 38.4 | 29.7 | 2.98 | 300 | 49/330 |
| 16 | 84.16 | 14.85 | 0.00 | 0.99 | 126.2 | 38.4 | 0.0 | 2.98 | 300 | 49/330 |
| 17 | 84.16 | 11.14 | 3.71 | 0.99 | 126.2 | 28.8 | 22.3 | 2.98 | 300 | 49/330 |
| 18 | 89.11 | 9.90 | 0.00 | 0.99 | 133.7 | 25.6 | 0.0 | 2.98 | 300 | 49/330 |
| 19 | 89.11 | 7.43 | 2.48 | 0.99 | 133.7 | 19.2 | 14.9 | 2.98 | 300 | 49/330 |

TABLE III

| Example Number | Wt. % Fiber | Wt. % Rubber | Wt. % Oil | Wt. % Hylene MP | Weight ¼" chopped Polyester Fiber, grams | Weight Neoprene 635 Latex (58% TS), grams | Weight DOP emul. 25% DOP, grams | Weight Hylene MP 50% Emul. grams | Water of Dilution, ml. | Epsom salts, grams/water, ml. |
|---|---|---|---|---|---|---|---|---|---|---|
| 20 | 79.21 | 19.80 | 0.00 | 0.99 | 240.0 | 103.4 | 0.0 | 5.4 | 450 | 35/400 |
| 21 | 79.21 | 14.85 | 4.95 | 0.99 | 240.0 | 77.6 | 60.0 | 5.4 | 420 | 35/400 |
| 22 | 84.11 | 14.85 | 0.00 | 1.05 | 255.0 | 77.6 | 0.0 | 5.7 | 470 | 27/400 |
| 23 | 84.11 | 11.13 | 3.71 | 1.05 | 255.0 | 58.2 | 45.0 | 5.7 | 445 | 27/400 |
| 24 | 88.99 | 9.89 | 0.00 | 1.12 | 270.0 | 51.7 | 0.0 | 6.1 | 475 | 18/400 |
| 25 | 88.99 | 7.42 | 2.47 | 1.12 | 270.0 | 38.8 | 30.0 | 6.1 | 460 | 18/400 |
| 26 | 93.88 | 4.49 | 0.00 | 1.18 | 285.0 | 25.9 | 0.0 | 6.4 | 475 | 9/400 |
| 27 | 93.88 | 3.71 | 1.24 | 1.18 | 285.0 | 19.4 | 15.0 | 6.4 | 470 | 9/400 |
| 28 | 69.39 | 29.74 | 0.00 | 0.87 | 210.0 | 155.2 | 0.0 | 4.7 | 460 | 53/400 |
| 29 | 69.39 | 22.30 | 7.43 | 0.87 | 210.0 | 116.4 | 90.0 | 6.4 | 300 | 53/400 |
| 30 | 59.55 | 39.70 | 0.00 | 0.74 | 180.0 | 206.9 | 0.0 | 4.0 | 400 | 71/400 |
| 31 | 59.55 | 29.78 | 9.93 | 0.74 | 180.0 | 155.2 | 120.0 | 4.0 | 280 | 71/400 |

EXAMPLE XXXII

As indicated above, in order to obtain a predispersed fiber composition having the greatest degree of homogeneity and a serum having no suspended solids, the total amount of water present in the slurry of fibrous material, latex and optional ingredients should be substantially equal to that required to completely wet the fibrous material by capillary action, surface adsorption or both. If less water than that is used, it was found that some of the fibrous material would not be wetted, and hence, could not be dispersed in the polymer resulting in a non-homogeneous product. If instead, more water is used, the resulting product would also be less homogeneous because polymer would coagulate independent of the fibers and the serum would contain suspended solids. Since homogeneity is a relative term, the homogeneity or heterogeneity of a given predispersed fiber composition can be measured in terms of the standard deviation in the percent by weight of the fibrous material. The standard deviation is the root mean square deviation, i.e., the square root of the average of the squares of the deviations from the mean.

Several predispersed fiber compositions containing 85 parts by weight of a fibrous material, 15 parts by weight of a polymer added as the latex, and 1 part by weight of an adhesion promoter were prepared in which the amount of the water of dilution was varied to determine its quantitative effect on the homogeneity of the resulting products. Initially, a 56% emulsion of a bis phenyl adduct of methylene bis (4-phenyl isocyanate) (Hylene MP) was prepared by placing 50 grams of a 10% solution of a fatty acid soap (T-11 from Procter & Gamble), 50 grams of water and 127 grams of Hylene MP into a Waring Blender and mixing at high speed until a homogeneous dispersion resulted. Then 255 grams of ¼-inch chopped polyester fibers (6E6025) were weighed into a four liter beaker. Into a different beaker was weighed 77.6 grams of a polychloroprene latex (Neoprene 635, 58% TS) to give 45 grams of polymer and 5.7 grams of the 56% Hylene MP dispersion to give 3.18 grams of Hylene MP. The appropriate amount of water of dilution was then added to the beaker and the whole slurry stirred to insure homogeneity. The amount of water varied in each case in order to achieve a desired percent of total solids, i.e., fibers plus polymer in the latex, in the slurry. After the diluted mixture of Neoprene 635 latex and Hylene MP was prepared, it was poured onto the chopped polyester fibers in the four liter beaker. This total mixture was then stirred with a large blade spatula until a homogeneous composition was achieved. While stirring, this mixture was coagulated by pouring a solution containing 30 grams of Epsom salts in 400 ml. of water into the four liter beaker. The resulting serum was poured and then pressed out of the wet product. The product was then washed with two liters of water and then washed again with an additional two liters of water. The wet predispersed fiber product was then removed from the beaker, squeezed free of excess wash water by hand, and placed in a forced air oven overnight at 120° F. to dry.

Between nine and twenty samples of approximately one gram each were taken from each batch of fiber predispersion. These samples were weighed to four decimal places and placed in 4-ounce bottles into which 100 ml. of trichloroethane was subsequently added. The sealed bottles were then placed on a shaker for a minimum of eight hours. After dissolving the rubber binder, the samples were individually filtered, rinsed twice with fresh trichloroethane and dried. The percent fibrous material was calculated using the weight of recovered fiber and the weight of the original sample. The standard deviations were then calculated for each batch using the experimentally determined percentage of fibrous material found for each sample. As will be appreciated, if the fiber predispersion produced is homogeneous, then all of the samples would have the same percentage of fibers and the standard deviation would be very small. However, if the product is heterogeneous, each sample would have a different percentage of fibers and the standard deviation would be large. A value of standard deviation of less than about 3 would be an acceptable value in order to obtain a product sufficiently homogeneous to insure uniform processibility and physical properties in the rubber or plastic compound stock into which the fibrous material is to be dispersed. The standard deviations and amount of water of dilution required for the desired percentage of total solids in the fiber slurry for each of the predispersed fiber compositions prepared are set forth below in Table IV:

TABLE IV

| Percent Total Solids of the Fiber Slurry | Weight of Dilution Water, grams | Standard Deviation ($\sigma$) |
|---|---|---|
| 8 | 3431.7 | 15.842 |
| 18 | 1326.1 | 11.015 |
| 28 | 724.5 | 5.803 |
| 38 | 439.6 | 2.527 |
| 48 | 273.4 | 0.967 |
| 58 | 164.5 | 0.652 |
| 68 | 87.6 | 0.601 |

These values of standard deviation in the percent by weight of the fibers present in the predispersed fiber compositions are plotted versus the percent total solids content of the fiber slurry prior to coagulation in the accompanying FIGURE. Referring to the FIGURE, it can be seen that the most homogeneous predispersed fiber composition than can be prepared from the particular fiber-latex-adhesion promoter combination used above in the weight percentages given, i.e., one which has standard deviation closest to zero, was prepared from a wetted fiber mixture having a total solids content greater than 68 percent. Most unexpectedly, however, it was found that as more water of dilution was added to the wetted fiber mixture decreasing the percent of total solids from about 68 to 48, the homogeneity of the resulting predispersed fiber composition remained substantially equal to that obtained at the point of greatest homogeneity. As seen from the FIGURE, the curve between 48 to 68 percent total solids is substantially a straight line. Moreover, it was found that as the amount of water of dilution was increased further, the curve reached what may be termed an inflection point at about 38 percent and then the heterogeneity increased sharply between about 28 percent and 8 percent total solids content with the curve again being substantially a straight line. For purposes of this invention that portion of the curve in which the homogeneity of the product is substantially equal to that of a product having the greatest degree of homogeneity as defined above will be referred to as the homogeneous portion of the curve and that portion having a greater degree of heterogeneity than the homogeneous portion will be referred to as the heterogeneous portion of the curve. As can be seen, as long as the fibrous material can hold all of the dilute latex, either by capillary action, surface adsorption or both, a homogeneous product is formed. However, as soon as the solids content drops low enough so that there is free latex present in the mixing container, polymer is coagulated independently of the fibers and the product becomes heterogeneous.

While it will readily be appreciated by those skilled in the art that, for any given composition and concentration of fibers, latex and optional ingredients used to prepare a predispersed fiber composition in accordance with the present invention, the values of standard deviation of the percent of fibrous material will vary from those illustrated in the FIGURE, it will be understood that the shape of the plot of standard deviation versus percent total solids will be substantially the same as that shown in the FIGURE.

EXAMPLE XXXIII

A predispersed fiber composition prepared in accordance with Example 20 above was mixed into a rubber compound stock to determine its processibility and physical properties. 66.25 parts of the predispersed fiber composition per hundred parts of rubber in the total composition was mixed in a two-roll laboratory mill with the ingredients listed in Table V:

TABLE V

| Ingredient | PHR |
| --- | --- |
| Neoprene GNA[1] | 86.75 |
| SUPER-SCORCHGUARD "O"[2] | 4.00 |
| HiSil 233[3] | 15.00 |
| SZD-85[4] | 5.89 |
| TSD-80[5] | 0.50 |

TABLE V-continued

| Ingredient | PHR |
| --- | --- |
| Thiate E[6] | 0.71 |

[1] Made by E. I. duPont deNemours & Co., Inc.
[2] A dispersion of magnesium oxide sold by Wyrough and Loser, Inc.
[3] Made by PPG Industries, Inc.
[4] 85% zinc oxide dispersed in SBR binder sold by Wyrough and Loser, Inc.
[5] 80% sulfur dispersed in EPDM binder sold by Wyrough and Loser, Inc.
[6] Trimethyl thiourea sold by R. T. Vanderbilt, Inc.

The predispersed fiber composition was found to be rapidly, uniformly and thoroughly dispersed into the rubber compound stock. The rubber composition produced was then cured in an ASTM tensile mold for 20 minutes at 320° F. The cured composition exhibited a tensile strength of 3800 psi, an elongation of 30 percent, and a Shore A hardness of 95.

What is claimed is:

1. A substantially homogeneous predispersed fiber composition useful for dispersing a fibrous material in a rubber or plastic compound stock, said composition comprising a fibrous material and a rubber or plastic polymer binder, wherein said composition is prepared by mixing a latex of the rubber or plastic polymer with the fibrous material to form a wetted fiber mixture, mixing a coagulant with the wetted fiber mixture thereby forming said fiber composition, wherein the percent of total solids in the wetted fiber mixture prior to coagulation which will result in the formation of said fiber composition is determined by first preparing several test predispersed fiber compositions having the same compositions as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption, or a combination thereof, from each of the several test fiber compositions obtained, a sufficient number of samples of approximately equal weight are analyzed to determine the percent of fibrous material present in each of the samples and to determine the standard deviation in the percent of fibrous material for each of the test fiber compositions, plotting a curve of the standard deviations obtained versus the percent of total solids in the test wetted fiber mixtures used to prepare each of the test fiber compositions, and then selecting a percent of total solids for the wetted fiber mixture prior to coagulation which corresponds to a point on the homogeneous portion of the curve wherein the homogeneity of the test fiber compositions is substantially equal to that obtained at the point where the total amount of water present in one of the test wetted fiber mixtures prior to coagulation is substantially equal to that required to completely wet the fibrous material by either capillary action, surface adsorption, or a combination thereof.

2. The composition of claim 1 wherein the fibrous material comprises greater than about 50 percent by weight of the composition.

3. The composition of claim 2 wherein the fibrous material comprises from about 75 to about 95 percent by weight of the composition.

4. The composition of claim 1 wherein the binder further comprises a plasticizer for the binder.

5. The composition of claim 1 wherein the binder further comprises a compound which promotes adhesion between the fibrous material and the rubber or plastic compound stock.

6. The composition of claim 4 wherein the binder further comprises a compound which promotes adhesion between the fibrous material and the rubber or plastic compound stock.

7. The composition of claim 1 wherein the binder further comprises an antidegradant for the binder.

8. The composition of claim 4 wherein the binder further comprises an antidegradant for the binder.

9. The composition of claim 5 wherein the binder further comprises an antidegradant for the binder.

10. The composition of claim 6 wherein the binder further comprises an antidegradant for the binder.

11. The composition of claim 1 wherein the fibrous material is selected from the group consisting of rayon, polyester, cotton, asbestos and glass, semisynthetic fibers.

12. The composition of claim 1 wherein the rubber or plastic polymer binder comprises a rubber or plastic polymer prepared by an emulsion polymerization process.

13. The composition of claim 12 wherein the rubber or plastic polymer is selected from the group consisting of (a) natural rubber, (b) polybutadiene, (c) copolymers of butadiene and one or more comonomers selected from styrene, acrylonitrile, methylmethacrylate, vinylpyridine or a derivative thereof, and a carboxylic acid, (d) polyisoprene, (e) polychloroprene, (f) copolymers of vinyl acetate and ethylene, (g) butyl rubber, (h) polyisobutylene, (i) poly(vinyl chloride), (j) poly(vinyl chloride-vinylidene chloride), (k) poly(vinylidene chloride), (l) acrylonitrile-butadiene-styrene copolymer and (m) styrene-acrylonitrile copolymer.

14. The composition of claim 1 wherein the rubber or plastic polymer binder comprises a rubber or plastic polymer prepared by a solution polymerization process.

15. The composition of claim 14 wherein the rubber or plastic polymer is selected from the group consisting of (a) EPDM, (b) EPR, (c) oxidized polyethylene, (d) block copolymers of styrene and butadiene, and (e) thermoplastic rubbers.

16. A substantially homogeneous predispersed fiber composition useful for dispersing a fibrous material in a rubber or plastic compound stock, said composition comprising a fibrous material and a rubber or plastic polymer binder, wherein said composition is prepared by mixing a latex of the rubber or plastic polymer with the fibrous material to form a wetted fiber mixture, mixing a coagulant with the wetted fiber mixture thereby forming said fiber composition, wherein the percent of total solids in the wetted fiber mixture prior to coagulation which will result in the formation of said fiber composition is determined by first preparing several test predispersed fiber compositions having the same composition as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption or a combination thereof, from each of the several test fiber compositions obtained, a sufficient number of samples of approximately equal weight are analyzed to determine the percent of fibrous material present in each of the samples and to determine the standard deviation in the percent of fibrous material for each of the test fiber compositions, plotting a curve of the standard deviations obtained versus the percent of total solids in the test wetted fiber mixtures used to prepare each of the test fiber compositions, and then selecting a percent of total solids for the wetted fiber mixture prior to coagulation which corresponds to a point on the portion of the curve which extends from the point where the total amount of water present in one of the test wetted fiber mixtures prior to coagulation is substantially equal to that required to completely wet the fibrous material by either capillary action, surface adsorption, or a combination thereof to the inflection point.

17. The composition of claim 16 wherein the fibrous material comprises greater than about 50 percent by weight of the composition.

18. The composition of claim 17 wherein the fibrous material comprises from about 75 to about 95 percent by weight of the composition.

19. The composition of claim 16 wherein the binder further comprises a plasticizer for the binder.

20. The composition of claim 16 wherein the binder further comprises a compound which promotes adhesion between the fibrous material and the rubber or plastic compound stock.

21. The composition of claim 19 wherein the binder further comprises a compound which promotes adhesion between the fibrous material and the rubber or plastic compound stock.

22. The composition of claim 16 wherein the binder further comprises an antidegradant for the binder.

23. The composition of claim 19 wherein the binder further comprises an antidegradant for the binder.

24. The composition of claim 20 wherein the binder further comprises an antidegradant for the binder.

25. The composition of claim 21 wherein the binder further comprises an antidegradant for the binder.

26. The composition of claim 16 wherein the fibrous material is selected from the group consisting of rayon, polyester, cotton, asbestos and glass fibers.

27. The composition of claim 16 wherein the rubber or plastic polymer binder comprises a rubber or plastic polymer prepared by an emulsion polymerization process.

28. The composition of claim 27 wherein the rubber or plastic polymer is selected from the group consisting of (a) natural rubber, (b) polybutadiene, (c) copolymers of butadiene and one or more comonomers selected from styrene, acrylonitrile, methylmethacrylate, vinylpyridine or a derivative thereof, and a carboxylic acid, (d) polyisoprene, (e) polychloroprene, (f) copolymers of vinyl acetate and ethylene, (g) butyl rubber, (h) polyisobutylene, (i) poly(vinyl chloride), (j) poly(vinyl chloride-vinylidene chloride), (k) poly(vinylidene chloride), (l) acrylonitrile-butadiene-styrene copolymer and (m) styrene-acrylonitrile copolymer.

29. The composition of claim 16 wherein the rubber or plastic polymer binder comprises a rubber or plastic polymer prepared by a solution polymerization process.

30. The composition of claim 29 wherein the rubber or plastic polymer is selected from the group consisting of (a) EPDM, (b) EPR, (c) oxidized polyethylene, (d) block copolymers of styrene and butadiene, and (e) thermoplastic rubbers.

31. A substantially homogeneous predispersed fiber composition useful for dispersing a fibrous material in a rubber or plastic polymer binder, wherein said composition is prepared by mixing a latex of the rubber or plastic polymer with the fibrous material to form a wetted fiber mixture, mixing a coagulant with the wetted fiber mixture thereby forming said fiber composition,
   wherein the percent of total solids in the wetted fiber mixture prior to coagulation which will result in the formation of said fiber composition is determined by first preparing several test predispersed fiber compositions having the same composition as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption, or a combination thereof,
   from each of the several test fiber compositions obtained, a sufficient number of samples of approximately equal weight are analyzed to determine the percent of fibrous material present in each of the samples and to determine the standard deviation in the percent of fibrous material for each of the test fiber compositions,
   plotting a curve of the standard deviations obtained versus the percent of total solids in the test wetted fiber mixtures used to prepare each of the test fiber compositions,
   and then selecting a percent of total solids for the wetted fiber mixture prior to coagulation which corresponds to a point on the curve at which the value of the standard deviation is less than about 3.

32. The composition of claim 31 wherein the fibrous material comprises greater than about 50 percent by weight of the composition.

33. The composition of claim 32 wherein the fibrous material comprises from about 75 to about 95 percent by weight of the composition.

34. The composition of claim 31 wherein the binder further comprises a plasticizer for the binder.

35. The composition of claim 31 wherein the binder further comprises a compound which promotes adhesion between the fibrous material and the rubber or plastic compound stock.

36. The composition of claim 34 wherein the binder further comprises a compound which promotes adhesion between the fibrous material and the rubber or plastic compound stock.

37. The composition of claim 31 wherein the binder further comprises an antidegradant for the binder.

38. The composition of claim 34 wherein the binder further comprises an antidegradant for the binder.

39. The composition of claim 35 wherein the binder further comprises an antidegradant for the binder.

40. The composition of claim 36 wherein the binder further comprises an antidegradant for the binder.

41. The composition of claim 31 wherein the fibrous material is selected from the group consisting of rayon, polyester, cotton, asbestos and glass fibers.

42. The composition of claim 31 wherein the rubber or plastic polymer binder comprises a rubber or plastic polymer prepared by an emulsion polymerization process.

43. The composition of claim 42 wherein the rubber or plastic polymer is selected from the group consisting of (a) natural rubber, (b) polybutadiene, (c) copolymers of butadiene and one or more comonomers selected from styrene, acrylonitrile, methylmethacrylate, vinylpyridine or a derivative thereof, and a carboxylic acid, (d) polyisoprene, (e) polychloroprene, (f) copolymers of vinyl acetate and ethylene, (g) butyl rubber, (h) polyisobutylene, (i) poly(vinyl chloride), (j) poly(vinyl chloride-vinylidene chloride), (k) poly (vinylidene chloride), (l) acrylonitrile-butadiene-styrene copolymer and (m) styrene-acrylonitrile copolymer.

44. The composition of claim 31 wherein the rubber or plastic polymer binder comprises a rubber or plastic polymer prepared by a solution polymerization process.

45. The composition of claim 44 wherein the rubber or plastic polymer is selected from the group consisting of (a) EPDM, (b) EPR, (c) oxidized polyethylene, (d) block copolymers of styrene and butadiene, and (e) thermoplastic rubbers.

46. A process for preparing a homogeneous predispersed fiber composition useful for dispersing a fibrous material in a rubber or plastic compound stock, wherein said composition comprises a fibrous material and a rubber or plastic polymer binder, said process comprising,
   mixing a latex of the rubber or plastic polymer with the fibrous material to form a wetted fiber mixture wherein the total amount of water present in the wetted fiber mixture prior to coagulation is substantially equal to that required to completely wet the fibrous material by either capillary action, surface adsorption, or a combination thereof, and
   mixing a coagulant with the wetted fiber mixture thereby forming the predispersed fiber composition.

47. A process for preparing a substantially homogeneous predispersed fiber composition useful for dispersing a fibrous material in a rubber or plastic compound stock, wherein said composition comprises a fibrous material and a rubber or plastic polymer binder, said process comprising,
   (a) mixing a latex of the rubber or plastic polymer with the fibrous material to form a wetted fiber mixture wherein the percent of total solids in the wetted fiber mixture prior to coagulation which will result in the formation of said fiber composition is determined by first preparing several test predispersed fiber compositions having the same composition as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption, or a combination thereof,
   from each of the several test fiber compositions obtained, a sufficient number of samples of approximately equal weight are analyzed to determine the percent of fibrous material present in each of the samples and to determine the standard deviation in the percent of fibrous material for each of the test fiber compositions, plotting a curve of the standard deviations obtained versus the percent of total solids in the test wetted fiber mixtures used to prepare each of the test fiber compositions, and then selecting a percent of total solids for the wetted fiber mixture prior to coagulation which corresponds to a point on the homogeneous portion of the curve wherein the homogeneity of the test fiber compositions is substantially equal to that obtained at the point where the total amount of water present in one of the test wetted fiber mixtures prior to coagulation is substantially equal to that required to completely wet the fibrous material by either capillary action, surface adsorption, or a combination thereof, and (b) mixing a coagulant with the wetted fiber mixture thereby forming the predispersed fiber composition.

48. A process for preparing a substantially homogeneous predispersed fiber composition useful for dispersing a fibrous material in a rubber or plastic compound stock, wherein said composition comprises a fibrous material and a rubber or plastic polymer binder, said process comprising (a) mixing a latex of the rubber or plastic polymer with the fibrous material to form a wetted fiber mixture wherein the percent of total solids in the wetted fiber mixture prior to coagulation which will result in the formation of said fiber composition is determined by first preparing several test predispersed fiber compositions having the same composition as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption or a combination thereof, from each of the several test fiber compositions obtained, a sufficient number of samples of approximately equal weight are analyzed to determine the percent of fibrous material present in each of the samples and to determine the standard deviation in the percent of fibrous material for each of the test fiber compositions, plotting a curve of the standard deviations obtained versus the percent of total solids in the test wetted fiber mixtures used to prepare each of the test fiber compositions, and then selecting a percent of total solids for the wetted fiber mixture prior to coagulation which corresponds to a point on the portion of the curve which extends from the point where the total amount of water present in one of the test wetted fiber mixtures prior to coagulation is substantially equal to that required to completely wet the fibrous material by either capillary action, surface adsorption or a combination thereof to the inflection point.

(b) mixing a coagulant with the wetted fiber mixture thereby forming the predispersed fiber composition.

49. A process for preparing a substantially homogeneous predispersed fiber composition useful for dispersing a fibrous material in a rubber or plastic compound stock, wherein said composition comprises a fibrous material and a rubber or plastic polymer binder, said process comprising (a) mixing a latex of the rubber or plastic polymer with the fibrous material to form a wetted fiber mixture wherein the percent of total solids in the wetted fiber mixture prior to coagulation which will result in the formation of said fiber composition is determined by first preparing several test predispersed fiber compositions having the same composition as that desired from several test wetted fiber mixtures, each of which has a different percent of total solids decreasing in equal increments from the point at which the total amount of water present in one of the test wetted fiber mixtures prior to coagulation is substantially equal to that required to completely wet the fibrous material by either capillary action, surface adsorption, or a combination thereof.

from each of the several test fiber compositions obtained, a sufficient number of samples of approximately equal weight are analyzed to determine the percent of fibrous material present in each of the samples and to determine the standard deviation in the percent of fibrous material for each of the test fiber compositions, plotting a curve of the standard deviations obtained versus the percent of total solids in the test wetted fiber mixtures used to prepare each of the test fiber compositions, and then selecting a percent of total solids for the wetted fiber mixture prior to coagulation which corresponds to a point on the curve at which the value of the standard deviation is less than about 3, and (b) mixing a coagulant with the wetted fiber mixture thereby forming the predispersed fiber composition.

50. A process comprising the rapid, uniform and thorough dispersion of a fibrous material into a rubber or plastic compound stock by mechanically mixing the predispersed fiber composition prepared by process of claims 46, 47, 48 or 49 with the rubber or plastic compound stock.

51. The new use of claim 50 wherein the binder further comprises a plasticizer for the binder.

52. The new use of claim 50 wherein the binder further comprises a compound which promotes adhesion between the fibrous material and the rubber or plastic compound stock.

53. The new use of claim 50 wherein the binder further comprises an antidegradant for the binder.

* * * * *